Aug. 13, 1968 HISASHI KANEKO ET AL 3,397,360

RECEPTION SYSTEM USING CARRIER DETECTION FOR ANGULARLY MODULATED SIGNALS

Filed Feb. 18, 1966

INVENTORS
HISASHI KANEKO
AKIRA SAWAI
BY Hopgood & Calimafde
ATTORNEYS

United States Patent Office 3,397,360
Patented Aug. 13, 1968

3,397,360
RECEPTION SYSTEM USING CARRIER DETECTION FOR ANGULARLY MODULATED SIGNALS

Hisashi Kaneko and Akira Sawai, Tokyo, Japan, assignors to Nippon Electric Company Limited, Tokyo, Japan, a corporation of Japan Filed Feb. 18, 1966, Ser. No. 528,473
1 Claim. (Cl. 325—45)

ABSTRACT OF THE DISCLOSURE

A receiver with a carrier detection facility for demodulating by means of an angle demodulator an incoming signal having an angularly modulated carrier which is switched on and off at the transmitter, the receiver also including means for detecting a carrier component of the incoming signal by a phase-locked circuit, so that the demodulated signal may be automatically switched on and off by the carrier-detected output, whereby the transmitted signal component may be reproduced in the receiver and suitable squelch provided during the "off" periods.

Figure 1:
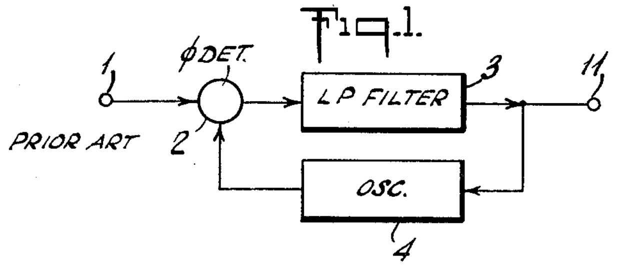

This invention relates to communication systems intended to switch angularly modulated carriers on and off at a transmitter in accordance with the presence or absence of signals to be transmitted. The invention relates more particularly to a reception system with a carrier detection facility for demodulation by means of an angle demodulator an incoming signal whose carrier has been angle-modulated and switched "on-off," and also for detecting a carrier component in the incoming signal by a phase-locked circuit, so that the demodulated signal may be automatically switch "on-off" by the carrier-detected output, whereby the transmitted signal component may be extracted.

It is well known that demodulated signals with improved signal-to-noise ($S/N$) ratios are available in angular modulation communication systems, such as, for instance, in frequency-modulation (FM) communication systems, because of the noise suppression effect due to the modulation index. It is also a well known fact that the high quality reception of FM signals is markedly impaired in the absence of an incoming signal carrier on account of a rapid increase of noise power in the receiver output.

Those knowledgeable in the art are also aware that in operating a mobile radio unit, such as may be installed in an automobile, carrier transmission is discontinued by removal of the finger from the handset button by the talker, and that this results in a rapid increase of noise in the distant receiver. To overcome such noise effect, means such as a squelch circuit, may be incorporated in FM receivers for detecting an increase in noise power and switching off the output circuit by the noise-detected output, in the absence of an incoming carrier. Although such a noise elimination arrangement finds suitable application in the "press-to-talk" type of communication system, it is inappropriate for applications in systems where a high degree of detection reliability and quick response time are required.

Thus, for instance, the previously mentioned arrangement could scarcely be applied in systems designed to transmit a carrier only when a voice signal is present, such as in the "VODAS" system or in the "Space Telecommunications System," because the objective of any of these systems is high-quality communication service in which both detection reliability and quick detection response capable of following the voice signal are required.

Accordingly, it is an object of this invention to provide a carrier "on-off" detection method and apparatus with high accuracy in a high quality FM carrier "on-off" communication system by combining in a novel manner the bandwidth compression characteristics of the phase-locked circuit with the synchronous detection method.

Another object of this invention is to provide a novel communication system wherein detection of an incoming carrier is achieved by effectively compressing the signal bandwidth with the output of a voltage-controlled oscillator.

One of the features of the invention is that in the reception of an FM signal the effective modulation index and hence the effective bandwidth of an incoming signal are substantially reduced or compressed by passing through a phase-locked circuit.

Figure 2A:
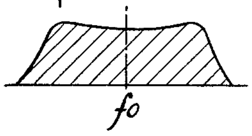
Figure 2B:
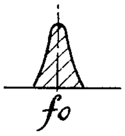
Figure 3A:
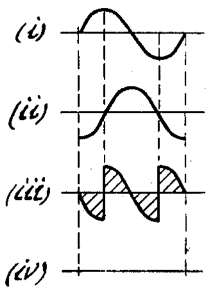
Figure 3B:
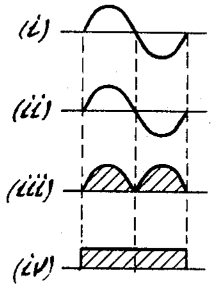

All of the objects, features and advantages of this invention and the manner of attaining them will become more apparent and the invention itself will be best understood by reference to the following description of an embodiment of the invention taken in conjunction with the accompanying drawing, in which:

FIG. 1 is a schematic block diagram illustrating a circuit arrangement of a conventional phase-locked circuit, FIGS. 2A and 2B schematically illustrate the frequency spectra of an input signal before and after the input signal has been subjected to bandwidth compression by a phase-locked circuit, FIGS. 3A and 3B show waveform diagrams illustrating the phase relations among the inputs and the output of a phase detector as an essential element of the circuit of FIG. 1 when carrier wave detection is performed.

Figure 4:
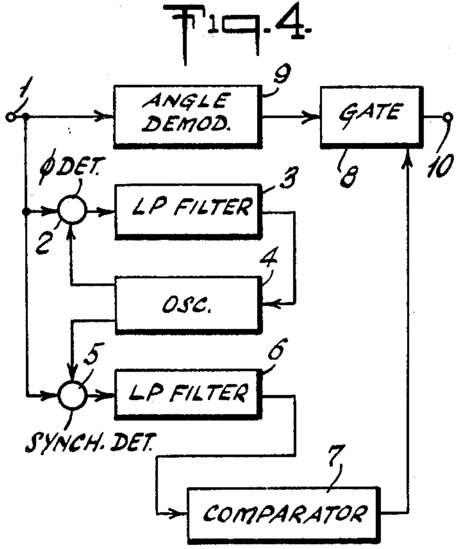
Figure 5:
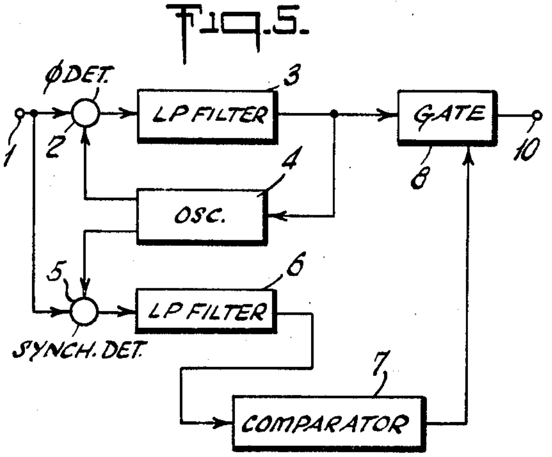

FIG. 4 is a schematic block diagram illustrating one embodiment of the invention, and FIG. 5 is a schematic block diagram of a second embodiment of the invention.

Referring now to FIG. 1, there is shown a circuit arrangement of a conventional phase-locked circuit provided with a phase feedback loop, wherein a phase detector 2 is employed to detect the phase difference between an FM signal applied to an input terminal 1, and the output of a voltage-controlled oscillator 4. The detected output appears at a terminal 11 as a demodulated signal via a low-pass filter 3, and the output of this low-pass filter is also applied to the voltage-controlled oscillator 4, the combination of the detector 2, the filter 3, and the oscillator 4 constituting a phase-locked loop.

Referring now also to FIG. 2A, suppose that an FM signal having a frequency spectrum centered at the frequency $f_0$ and spread widely on either side of this frequency has arrived at the input terminal 1. Then the voltage-controlled oscillator 4, which has a center frequency the same as the frequency $f_0$, will be so controlled by the phase-locked circuit that the relative phase difference between the input signal and the oscillator output signal will be considerably reduced. Accordingly, the effective modulation index of the incoming signal is also reduced and a bandwidth-compressed detected signal as illustrated in FIG. 2B appears at the output of the phase detector 2.

The principal aspect of this invention may be said to reside in detecting an incoming carrier by effectively compressing the signal bandwidth with the output of a voltage-controlled oscillator, in accordance with the above-mentioned phenomenon.

As is well known, one of the characteristics of the phase-locked circuit is to cause the mean phase of the output of a voltage-controlled oscillator to shift by 90 degrees from the mean phase of an incoming angularly modulated signal. Consequently, by shifting the phase of the output of the voltage-controlled oscillator by 90 degrees, the mean phase of the output is brought into coincidence with that of an incoming angularly modulated signal, with the result that the carrier amplitude can be detected by the synchronous detection method in the manner illustrated in FIGS. 3A and 3B, now to be described.

Referring now specifically to FIGS. 3A and 3B, (i) shows the waveform of the incoming carrier, (ii) shows the voltage-controlled oscillator output waveform, (iii) shows the detector output waveform, and (iv) shows the filter output waveform, the waveforms of FIG. 3A illustrating phase relations at the phase detector and those of FIG. 3B illustrating phase relations at the carrier detector.

For a further understanding of this invention, two embodiments of the invention will now be described with reference to FIGS. 4 and 5. In FIGS. 4 and 5 the numerals 1 through 4 designate similar parts as in FIG. 1 and constitute in combination substantially the same circuit arrangement as the phase-locked circuit shown in FIG. 1. The voltage-controlled oscillator 4 in FIGS. 4 and 5 however, develops, besides the same output as indicated in FIG. 1, another output in quadrature phase relation therewith for operating a synchronous detector 5.

Referring still to FIG. 4, by means of the output of the synchronous detector 5, carrier detection is carried out with the signal applied to the input terminal 1. Furthermore, in the presence of an incoming carrier, the phase-locked circuit, comprising the circuit elements 2 through 4, is arranged to provide sufficient feedback and also sufficient bandwidth compression to obtain a DC output of appropriate magnitude at the output of the synchronous detector 5. However, in the absence of an incoming carrier the gain in the feedback loop is lowered and the voltage-controlled oscillator 4 initiates free oscillations, so that noise proportional to the noise amplitude arriving at the input terminal 1 is produced in the output of the synchronous detector 5.

As a consequence, the DC component contained in the output of the synchronous detector 5 can be extracted, in the presence of an incoming carrier, by passing the output through a low-pass filter 6, whereby carrier detection becomes possible. The output of the low-pass filter 6 is applied to a comparator 7, having the function of discriminating whether or not the output of the low-pass filter 6 is larger than a predetermined threshold value and of delivering information as to the presence or absence of an incoming carrier in the form of electrical signals.

The arrangement of FIG. 4 further includes an angle demodulator 9, having its input connected to the input terminal 1. The demodulated output from the angle demodulator 9 retains the interfering noise which would be predominant if no carrier arrived. This necessitates application of the demodulated output to a gating circuit 8 and switching the output of the angle demodulator 9 "on-off" automatically by the output of the comparator 7. A demodulated signal of optimum quality from which interfering noise has been removed will then be obtained at the output terminal 10. In cases where the incoming angularly modulated signal is an FM signal, the demodulated signal may be obtained from the output of the low-pass filter 3 in FIG. 4.

FIG. 5 shows a schematic block diagram of a further embodiment of this invention. The circuit arrangement of FIG. 5 is similar to that of FIG. 4, but the output of the low-pass filter 3 is applied to the input of the gating circuit 8, in place of the output of the angle demodulator 9 being applied to said input. It will be appreciated that a demodulated signal of excellent quality can also be obtained at the output terminal 10 of FIG. 5 by automatically switching the gating circuit 8 "on-off" by means of the output of the comparator 7.

While the foregoing description sets forth the principles of the invention in connection with specific apparatus, it is to be understood that the description is made only by way of example and not as a limitation of the scope of the invention as set forth in the objects thereof and in the accompanying claim.

What is claimed is:

1. An angular modulation reception system incorporating a carrier detection facility and adapted for receiving equipment operating in a communication network such that a modulated carrier is transmitted or discontinued in accordance with the presence or absence of a signal transmitted at the transmitter characterized by comprising a phase-locked circuit including a loop containing a voltage-controlled oscillator and a phase detector and arranged to be phase-locked with an angularly modulated incoming signal applied to said phase detector, a synchronous detector, said synchronous detector being controlled by a signal from said oscillator that is obtained by shifting the phase of the output of said oscillator by 90 degrees, said incoming signal also being applied to said synchronous detector at its input, a low-pass filter coupled to the output of said synchronous detector, a comparator for detecting whether or not the output of said filter is above a predetermined level of amplitude, an angle demodulator for deriving a demodulated signal output from said incoming signal, a gating circuit for receiving said demodulated signal output, and means connecting said comparator to said gating circuit for controlling said gating circuit in an "on-off" manner, whereby said demodulated signal output appears at the output of said gating circuit in accordance with the "on-off" operation thereof.

References Cited

UNITED STATES PATENTS

| | | | |
|---|---|---|---|
| 3,358,234 | 12/1967 | Stover | 325—50 X |
| 2,501,416 | 3/1950 | Smith | 325—348 |
| 2,761,964 | 9/1956 | Rosenzvaig | 325—348 |
| 3,069,625 | 12/1962 | Morita et al. | 325—346 X |
| 3,100,871 | 8/1963 | Richardson et al. | 325—330 |

ROBERT L. GRIFFIN, *Primary Examiner.*

B. V. SAFOUREK, *Assistant Examiner.*